United States Patent [19]

Kochka et al.

[11] 4,448,343
[45] May 15, 1984

[54] SLEEVE PREPARATION METHOD

[75] Inventors: Edgar L. Kochka, Greentree; Robert D. Burack, Pleasant Hills; Kenneth E. Pfeiffer, Penn Township, Allegheny County, all of Pa.

[73] Assignee: Westinghouse Electric Corp., Pittsburgh, Pa.

[21] Appl. No.: 307,354

[22] Filed: Sep. 30, 1981

[51] Int. Cl.³ ............................................. B23K 1/20
[52] U.S. Cl. .................................. 228/205; 228/119; 228/224; 228/248
[58] Field of Search ............... 228/248, 253, 255, 224, 228/119, 173 F, 56 R, 205, 207, 210; 139/97, 98

[56]  References Cited

U.S. PATENT DOCUMENTS

| 2,120,067 | 6/1938 | Gray | 228/255 |
|---|---|---|---|
| 2,646,620 | 7/1953 | Geddes | 29/360 |
| 2,897,106 | 7/1959 | Morrison | 148/23 |
| 2,951,994 | 4/1952 | Alexander | 331/113 A |
| 3,025,596 | 3/1962 | Ward | 29/471.1 |
| 3,040,781 | 6/1962 | Reymann | 138/145 |
| 3,205,573 | 9/1965 | Seal | 29/474.4 |
| 3,384,951 | 5/1968 | Binger | 29/495 |
| 3,464,617 | 9/1969 | Raynes | 228/56 |
| 3,471,310 | 10/1969 | Joseph | 117/22 |
| 3,478,414 | 11/1969 | Potter | 29/495 |
| 3,912,148 | 10/1975 | Johnson | 228/119 |
| 3,960,308 | 6/1976 | Jonason | 228/5.1 |
| 3,960,614 | 6/1976 | Stayner | 148/23 |
| 3,986,899 | 10/1976 | Kole | 148/24 |
| 4,025,035 | 5/1977 | Jonason | 228/185 |
| 4,025,037 | 5/1977 | Shibayama | 228/214 |
| 4,028,789 | 6/1977 | Loch | 139/97 |
| 4,069,573 | 1/1978 | Rogers, Jr. | 24/421 R |
| 4,134,529 | 1/1979 | Hara | 228/175 |
| 4,172,547 | 10/1979 | DelGrande | 228/121 |

FOREIGN PATENT DOCUMENTS

| EP 25988 | 3/1981 | European Pat. Off. ............ 228/207 |
|---|---|---|
| 49489 | 4/1982 | European Pat. Off. . |
| 815437 | 8/1951 | Fed. Rep. of Germany . |
| 2233128 | 1/1975 | France . |
| 2391803 | 12/1978 | France . |
| 2460174 | 1/1981 | France . |
| 2479055 | 10/1981 | France . |
| 190211 | 4/1937 | Switzerland .................... 228/253 |
| 2047150 | 3/1979 | United Kingdom ............... 228/224 |

OTHER PUBLICATIONS

Olds, F. C., *Skeving Saves Nuclear Steam Generator Tubes*, Power Engineering, Dec. 1981, pp. 73–75.
Delmonte, John, *Technology of Adhesives*, (1947), p. 152.

*Primary Examiner*—Kenneth J. Ramsey
*Assistant Examiner*—Marc Hodak
*Attorney, Agent, or Firm*—L. A. DePaul; Z. L. Dermer

[57]  ABSTRACT

The method comprises applying a braze material to a sleeve in a manner so that the sleeve may be attached to a tube so as to bridge the defective region of the tube. The sleeve is constructed to have a groove on the outside surface thereof that extends around the entire circumference. The groove is filled with braze material and a flux is applied to the braze material in a manner to prevent the braze material and flux from becoming removed. Once such a sleeve has been inserted into the defective tube, the sleeve is internally expanded in the area of the sleeve wherein the groove is located. The expansion of the sleeve in the area wherein the groove is located causes the braze material to closely contact the inside surface of the tube. The other end of the sleeve can then be either similarly placed in contact with the tube or welded to the tube. Next, the area of the tube wherein the braze material is located is internally heated so as to create a brazed joint between the sleeve and the tube. When the joint has cooled, a leak-tight joint is formed between the sleeve and the tube.

6 Claims, 4 Drawing Figures

SLEEVE PREPARATION METHOD

CROSS-REFERENCE TO RELATED APPLICATIONS

This application is related to copending application Ser. No. 185,654, filed Sept. 9, 1980, in the name of R. D. Burack and entitled "Braze Sleeving Method" which is assigned to the Westinghouse Electric Corporation.

BACKGROUND OF THE INVENTION

This invention relates to tube repair methods and more particularly to methods for preparing and attaching a sleeve within a tube by a brazing procedure.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to plug the tube so that the fluid does not flow through the tube, thereby preventing leakage from the tube.

In nuclear reactor power plants, the tube-type heat exchangers are commonly referred to as steam generators. When a defect occurs in the tubes of a nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube. This prevents contamination of the fluid surrounding the tubes.

There are several methods known in the art for repairing heat exchange tubes, however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metallurgical bonding techniques have problems which are not easily solvable in areas such as nuclear steam generators where human access is limited. In addition, there are many methods known in the art for preparing the sleeves prior to insertion and brazing; however, those methods do not address the problem of preparing a sleeve for use in a nuclear environment.

While there are methods known in the art for preparing tubes for brazing, for inserting sleeves within tubes of heat exchangers, and for brazing tubes together, there do not exist methods for preparing, inserting and brazing sleeves in nuclear steam generator heat exchange tubes which are capable of being performed where personnel access is limited and where a leaktight joint is needed. Therefore, what is needed is a method for preparing and securing a sleeve within a heat exchange tube of a nuclear steam generator by brazing that produces a leaktight joint between the sleeve and the tube so that no leakage occurs from the tube in the defective region.

SUMMARY OF THE INVENTION

The method comprises applying a braze material to a sleeve in a manner so that the sleeve may be attached to a tube so as to bridge the defective region of the tube. The sleeve is constructed to have a groove on the outside surface thereof that extends around the entire circumference. The groove is filled with braze material and a flux is applied to the braze material in a manner to prevent the braze material and flux from becoming removed. Once such a sleeve has been inserted into the defective tube, the sleeve is internally expanded in the area of the sleeve wherein the groove is located. The expansion of the sleeve in the area wherein the groove is located causes the braze material to closely contact the inside surface of the tube. The other end of the sleeve can then be either similarly placed in contact with the tube or welded to the tube. Next, the area of the tube wherein the braze material is located is internally heated so as to create a brazed joint between the sleeve and the tube. When the joint has cooled, a leaktight joint is formed between the sleeve and the tube.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

When a heat exchange tube in a nuclear steam generator becomes defective, it becomes necessary to either plug the heat exchange tube or to repair the defective area. The invention described herein provides a method for repairing the defective area in the heat exchange tube in a nuclear steam generator by bridging the defective area with a brazed metal sleeve.

Figure 1:
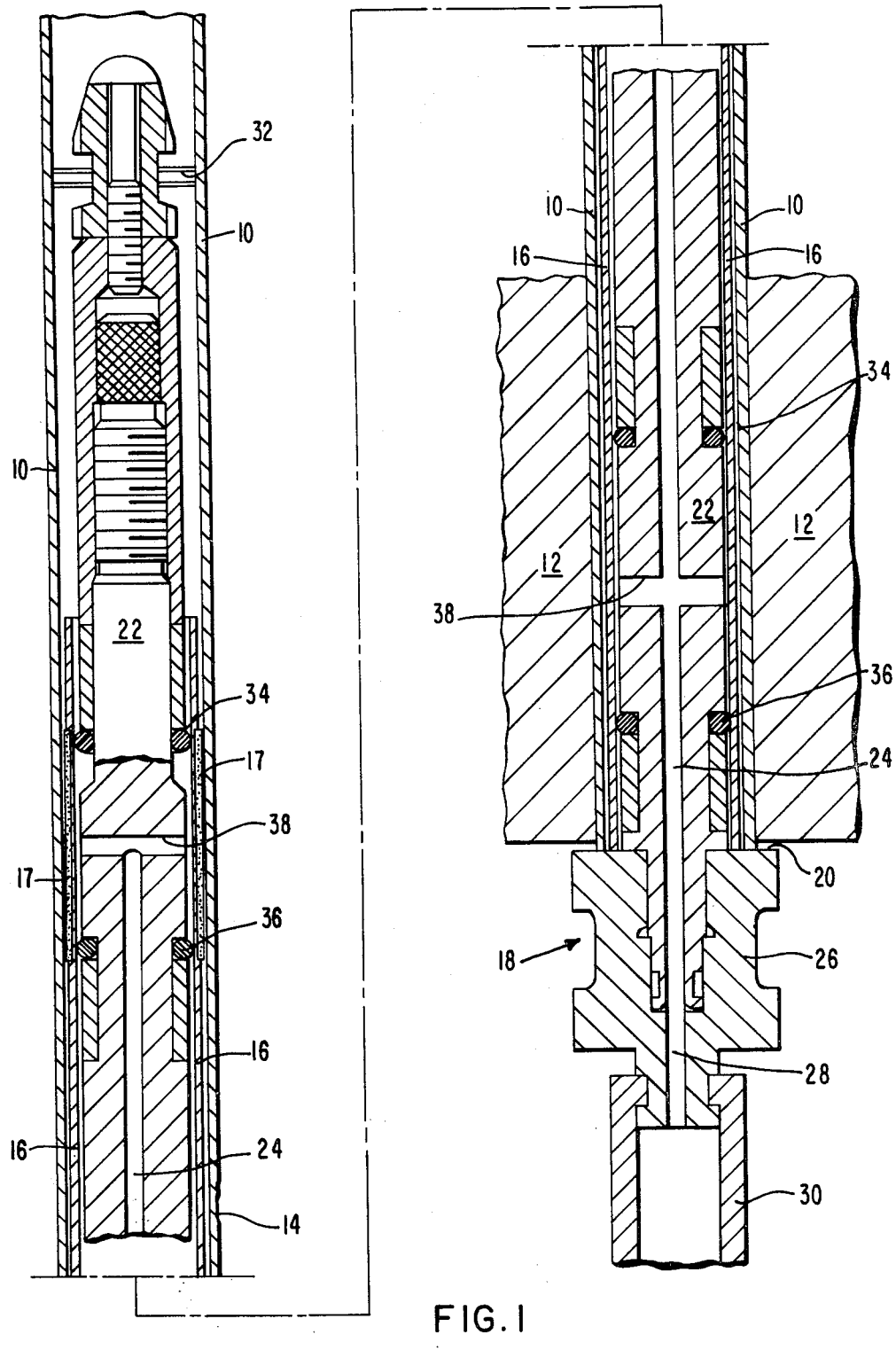
FIG. 1 is a cross-sectional view in elevation of a sleeve and expander apparatus disposed within a heat exchange tube.

Referring now to FIG. 1, the nuclear steam generator (not shown) comprises a plurality of heat exchange tubes 10 which may be U-shaped tubes and are attached at each end to a tubesheet 12. During operation of the nuclear steam generator, reactor coolant flows through the heat exchange tubes 10 in a manner so as to heat fluid surrounding tubes 10. The fluid around tubes 10 is converted to steam to produce electricity in a conventional manner. Since the reactor coolant flowing through heat exchange tubes 10 has passed through the nuclear reactor, it is radioactive. Therefore, it is important to isolate the coolant flowing through the tubes from the fluid surrounding the tubes. When a defect develops in heat exchange tube 10 such as defect 14, it is necessary to either plug heat exchange tube 10 or repair the area surrounding defect 14 so that no coolant leaks through defect 14. One method of repairing defect 14 is by inserting a metal sleeve 16 into heat exchange tube 10 in a manner so as to bridge the defective area. Sleeve 16, which may be an Inconel sleeve, has a notch or annular groove 17 machined in the outer circumference thereof for having braze material deposited therein.

Before sleeve 16 can be used in heat exchange tube 10, the braze material must be deposited in groove 17. Groove 17, which may be approximately 0.015 inches in depth and approximately 0.350 inches long, is generally arranged approximately 2 inches from the end of sleeve 16. In addition, the volume of groove 17 is aproximately 1.5 to 3.0 times the volume of the joint to be created such that when filled with braze material, the volume of the braze material in the groove is approximately 1.5 to 3.0 times the joint volume also. Before the braze material is placed in groove 17, sleeve 16 is cleaned with a mildly abrasive cloth such as an emergy cloth to remove all foreign substances and peened with a 60 grit size metal alloy shot with approximately 35-45 psi air pressure carrier to roughen the surface.

Next, the braze material which may be 82% gold and 18% nickel is deposited into groove 17. The depositing of the braze material may be accomplished by sliding a braze preform, made in the form of a split ring, over sleeve 16 until the braze preform snaps securely into place in groove 17.

After the braze preform has been placed in groove 17, the braze preform and sleeve 16 are then cleaned with an acetone solvent followed by an alcohol wipe using a cloth or similar mechanism.

Next, an adhesive is applied to sleeve 16 for retaining a flux material. The adhesive which is applied may be a solution of approximately 1.5% to 12% acrylic resins by weight and preferably 6% acrylic resins by weight dissolved in toluene. The acrylic resin may be an ethyl methacrylate copolymer such as Rhom and Haas Type B-72 Acryloid 50% solids in Toluene. The adhesive may be applied by dipping sleeve 16 into the adhesive to a depth of approximately 1.25-1.50 inches above the center of groove 17 to insure complete coverage of the braze material. When sleeve 16 is removed from the adhesive, sleeve 16 should be allowed to drain so that the excess adhesive will drain off sleeve 16. Sleeve 16 is then heated to between approximately 150°-165° C. to soften the adhesive. This heating may be accomplished by conventional heating means that provides a uniform heating around the circumference of the sleeve such as by heat lamps or a furnace.

While the adhesive is still hot (approximately 120°-150° C. for the acrylic resin), sleeve 16 is immersed in a fluidized bed of flux such as sodium tetraborate powder ($Na_2B_4O_7$) so that the sodium tetraborate flux will adhere to the adhesive thus bonding the flux to the braze material and sleeve 16. The fluidized bed of sodium tetraborate powder may be established with approximately 100% fused sodium tetraborate flux powder in a dry argon gas or dry nitrogen gas carrier. The excess flux may be removed by shaking sleeve 16 thus dislodging the non-adherent flux powder. During the brazing process, the flux liquifies and flows prior to the braze material thereby ensuring good wetting of both the sleeve and the tube surfaces by the braze material. The use of the flux also eliminates the requirements for extensive precleaning of the interior of the sleeve and the need for a protective atmosphere during brazing. In addition, an acrylic such as Krylon 1301 may be gently sprayed over the flux to ensure adhesion of the flux to the braze material and to provide a protective film. The use of a preplaced braze preform and an encapsulated flux permits the sleeves to be manufactured in large quantities at a facility away from the brazing site.

Next, sleeve 16 is heated to between approximately 120° C. to 180° C. for 5 to 15 minutes and preferably at 150° C. for 10 minutes then cooled to ambient temperature. This step fuses the surface of the sprayed-on acrylic to protect the flux from abrasion and moisture attack.

Finally, to conform to close dimensional tolerances, irregularities in the surface of the braze preform can be removed, if necessary, by a silicon carbide 80 to 180 grit emery cloth thereby completing the braze material application to sleeve 16.

Again referring to FIG. 1, when it is necessary to repair a defect such as defect 14, the nuclear steam generator is drained of its coolant and deactivated so that the end of a tube 10 can be reached by either remote access manipulators or by working personnel. Tube 10 is then cleaned to remove the internal oxide layer therefrom. The cleaning process may comprise the use of a rotatable abrasive hone which may be a wire brush with a high pressure water mist coolant. The honing process takes approximately 1 minute and extends approximately 6 inches above and 6 inches below the proposed joint. In this cleaning process, the entire oxide layer is removed from the interior of the tube and washed out by the high pressure water so that a reliable braze bond may be achieved. The oxide layer that is on the interior of tube 10 may be approximately 0.001 inches in thickness and can be removed using a rotatable hone moving at approximately 6 feet per minute in a linear direction and at about 800 rpm. The honing apparatus used for this cleaning process may be one such as that described in copending U.S. patent application Ser. No. 085,444, filed Oct. 16, 1979 in the name of E. H. Smith et al. and entitled "Decontamination Apparatus" or Ser. No. 930,076 filed Aug. 1, 1978, in the name of F. W. Cooper, Jr. and entitled "Segmented Flexible Hone" both of which are assigned to the Westinghouse Electric Corporation.

Once the oxide layer has been removed from the interior of tube 10, the tube may then be cleaned with a solvent such as methyl-ethyl ketone or acetone. This may be accomplished by using a rotatable member having a cotton swab attached thereto and which disburses the solvent in mist form. The device used to apply the solvent and clean the interior of tube 10 may be similar to that described in copending U.S. patent application Ser. No. 085,444, filed Oct. 16, 1979 in the name of E. H. Smith et al. and entitled "Decontamination Apparatus"; however, in this instance the abrasive hone is replaced with a cotton swab. In this step, as the rotating apparatus rotates within tube 10, the solvent is sprayed from the apparatus and onto the cotton swab. Also, as the apparatus is rotated within tube 10, the cotton swab having the solvent thereon contacts the interior of tube 10 thereby removing any remaining loose oxides. As with the abrasive hone, the cotton swab hone is used to clean the interior of tube 10 approximately 6 inches above and 6 inches below the joint area.

When the tubes 10 have been cleaned as described above, the tubes are then dried to remove any liquid from the interior of tube 10. For example, a blower may be placed in fluid communication with one end of tube 10 so as to blow hot dry air through the tube and out the other end of tube 10. This drying process is continued until the tube 10 is dry. Any superficial oxidation that occurs after these cleaning steps that might prevent wetting of the tube or sleeve surfaces by the molten braze alloy will be dissolved by the pre-placed flux. Likewise, any oxidation that occurs during heating in the ambient atmosphere to brazing temperatures will be dissolved by the flux.

Then sleeve 16 is positioned over an expander 18 which may be a hydraulic expander or a roll expander chosen from those well known in the art. Sleeve 16 is positioned over expander 18 such that one end of sleeve 16 is placed on ledge 20 of expander 18. Expander 18 with sleeve 16 mounted thereon is then inserted into tube 10 as shown in FIG. 1. Ledge 20 of expander 18 is brought into contact with the bottom end of tube 10 so that the bottom end of sleeve 16 and the bottom end of tube 10 are in alignment. This provides an indexing point from which operators can determine the location of the top and bottom ends of sleeve 16 with respect to tube 10.

Still referring to FIG. 1, expander 18 comprises a central metal member 22 having a bore 24 therein for passage of a fluid therethrough. Central member 22 is attached at its lower end to end piece 26 whereon ledge 20 is located. End piece 26 also has a second bore 28 therein which is in colinear alignment with first bore 24. A flexible conduit 30 may be attached to the lower end of end piece 26 for conducting a fluid through second bore 28 and into first bore 24. A guide mechanism 32 may be attached to the top end of central member 22 for positioning expander 18 centrally within tube 10. Guide member 32 may be annular plastic strips attached to central member 22 or may be brush-like members for maintaining central member 22 in the proper relationship within tube 10 while allowing guide member 32 to pass through constricted portions of tube 10. A set of first seals 34 and a set of second seals 36 are disposed on central member 22 so as to define an annular area wherein sleeve 16 to be expanded. In the case where sleeve 16 is to be expanded in several locations along its length, an additional first set of seals 34 and second set of seals 36 are located at that location. The seals may comprise a rubber O-ring and a neoprene backup ring chosen from those well known in the art. The seals are arranged to tightly contact the inside surface of sleeve 16. A transverse bore 38 is also provided in central member 22 and in fluid communication with first bore 24 for conducting a fluid from first bore 24 to the annular area defined between first seals 34 and second seals 36 for expanding sleeve 16 into contact with tube 10.

Figure 2:
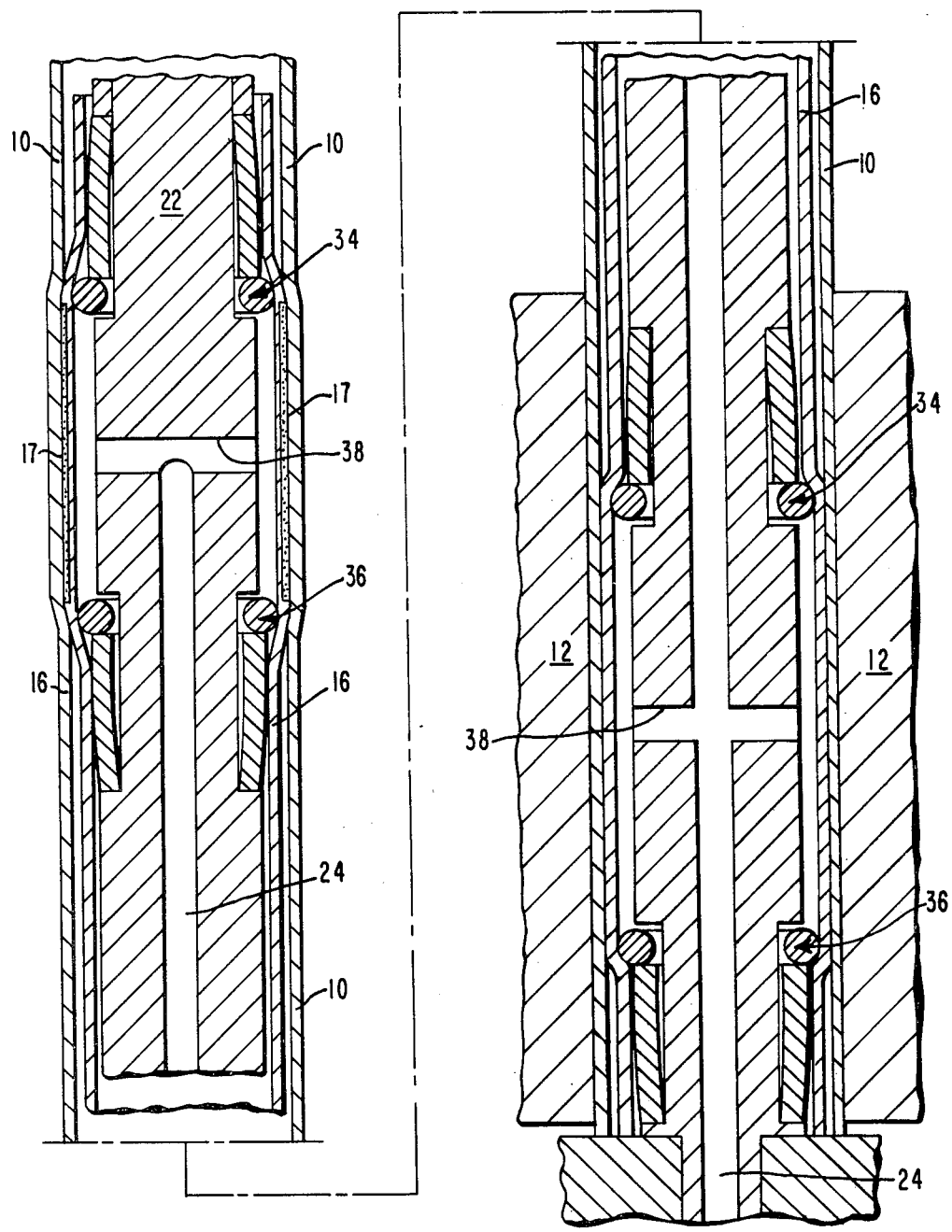
FIG. 2 is an enlarged view of the sleeve and tube in the expanded configuration.

Once sleeve 16 and expander 18 have been positioned in tube 10 as shown in FIG. 1, a fluid such as water is introduced from a fluid source (not shown) through flexible conduit 30 at a pressure of between approximately 12,000 psi and 16,000 psi. The fluid flows through second bore 28, through first bore 24, and through transverse bore 38. From transverse bore 38 the fluid enters the annular chamber defined between first seals 34 and second seals 36. The fluid pressure causes sleeve 16 to expand into contact with and also expand tube 10 by approximately 0.005 inches as shown in FIG. 2. The deformation of tube 10 may not be visually noticeable but can be felt by manual inspection. The expansion causes permanent plastic deformation of both tube 10 and sleeve 16 so that sleeve 16 is in close contact with tube 10. The expansion of both sleeve 16 and tube 10 causes the braze material in groove 17 to be in close contact with the inside surface of tube 10. However, a small capillary gap of approximately 0.002 inches generally remains between sleeve 16 and tube 10 into which the braze material flows when heated. Generally, the length of sleeve 16 to be expanded in the region of groove 17 is approximately 1.5 inches. In this manner, sleeve 16 is positioned firmly within tube 10 but is not yet completely sealed. Approximately 2.0 inch length of sleeve 16 in the tubesheet area is placed in close contact with tube 10 in that region to provide a good joint.

As an alternative to or in addition to hydraulically expanding sleeve 16 in the region of tubesheet 12, sleeve 16 may be mechanically hard rolled using conventional apparatus. In either case, sleeve 16 is expanded approximately 0.002–0.005 inches on the diameter.

It should be noted that since both the lower end of sleeve 16 and the lower end of tube 10 have greater accessibility than does the upper section of sleeve 16, these lower ends can be welded by conventional methods or may be brazed as described above. The expansion of the lower end of sleeve 16 into contact with tube 10 is performed to increase the contact between sleeve 16 and tube 10 in that area and to enhance the weldability of sleeve 16 and tube 10 in that area. It should be further noted that since the end of sleeve 16 and tube 10 are capable of being welded, it is not necessary to braze that section of sleeve 16.

Figure 3:
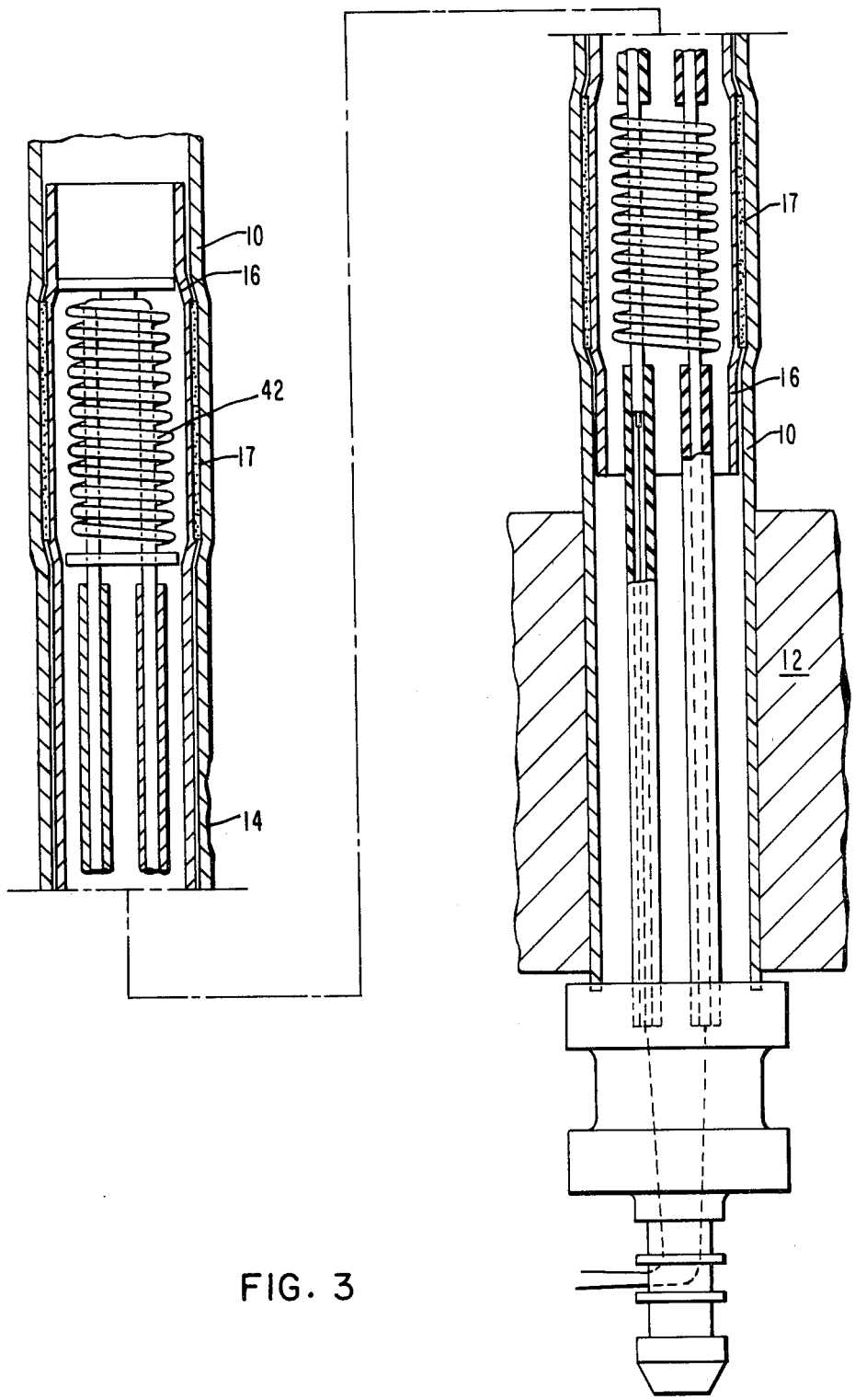
FIG. 3 is a cross-sectional view in elevation of the sleeve with the heater disposed therein.

Referring now to FIG. 3, a heater such as electrical induction coil 42 is inserted in sleeve 16 so that induction coil 42 is positioned in the area of sleeve 16 wherein the braze material is located. Induction coil 42 may be a water-cooled copper coil capable of carrying between approximately 2–4 kilowatts of power. Induction coil 42 may incorporate a quartz-fiber optical feedback mechanism to monitor and control temperatures of sleeve 16 in the joint region. Once placed in proper relationship, induction coil 42 is activated so as to heat sleeve 16 and the braze material therein to a temperature between approximately 1800° F. and 2150° F. Preferably, the braze material should be heated to a temperature of between approximately 1850° F. to 1950° F. Generally, it takes approximately 30 seconds for the induction coil 42 to heat the braze material to this temperature. Once in the recommended temperature range, the temperature should be held at that range for approximately 15–30 seconds. At approximately 1400° F., the flux melts and flows into the gap between the sleeve 16 and tube 10, deoxidizing and cleaning the inner surface of tube 10 thereby allowing good flow of the braze alloy. Also, the adhesive vaporizes leaving no residue which could hinder braze joint quality. When heated to the braze temperature, the braze material flows out of groove 17 and into the small gap between sleeve 16 and the inner surface of tube 10. The braze material flows into the gap between sleeve 16 and the inner surface of tube 10 filling the gap therebetween so as to create an effective braze joint therebetween. Next, induction coil 42 is removed from sleeve 16 and the braze material is allowed to cool. Once cooled, a solid brazed joint is formed between sleeve 16 and tube 10. In this configuration, sleeve 16 prevents leakage from tube 10 through defect 14.

Figure 4:
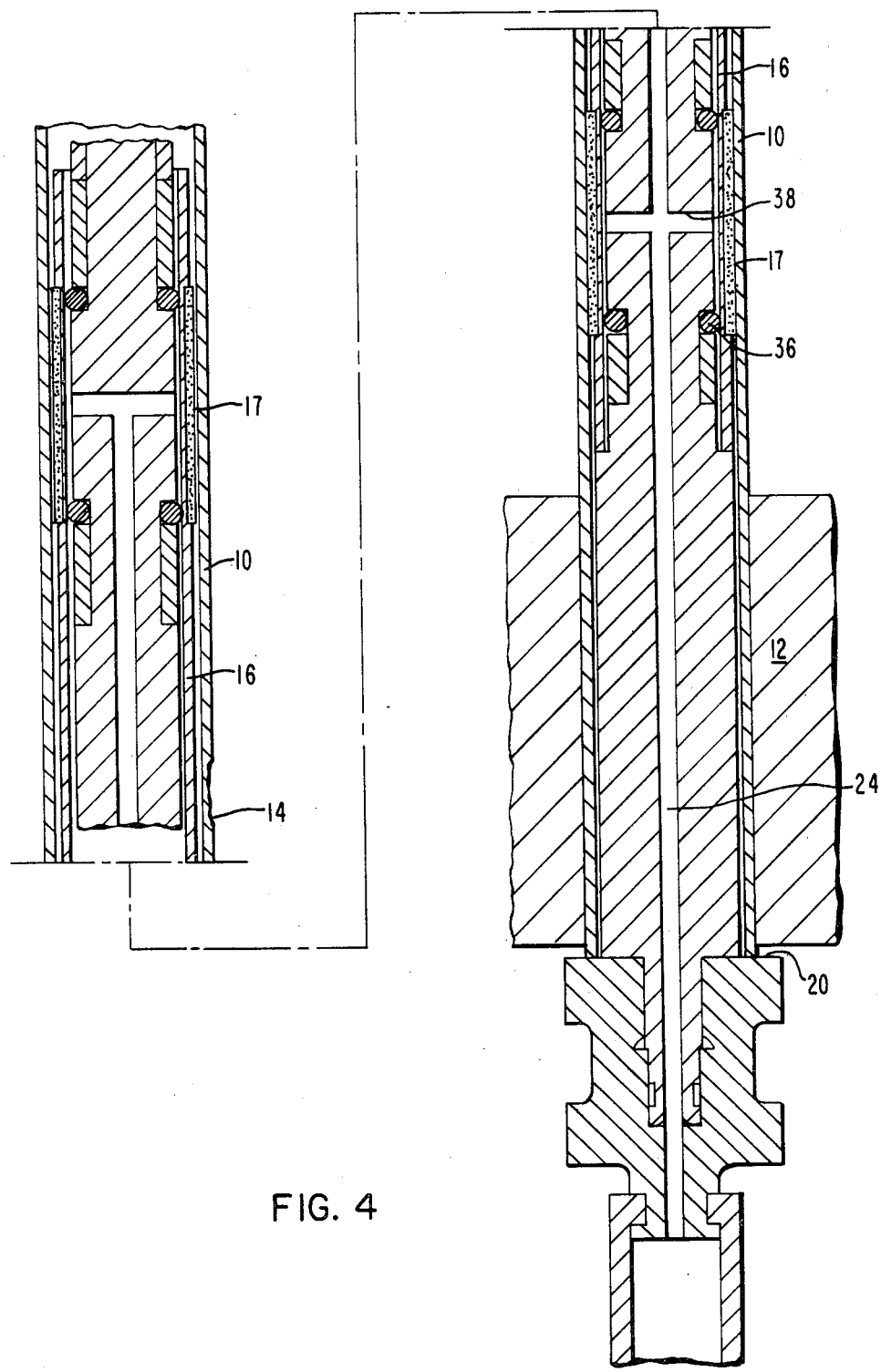
FIG. 4 is a cross-sectional view in elevation of the sleeve within a tube in an alternate arrangement.

As an alternative, due to the location of defect 14, it may be necessary to position sleeve 16 above tubesheet 12. In this case, an expander 18 as shown in FIG. 4 may be utilized to expand a plurality of grooves 17 into contact with tube 10. In this embodiment, since sleeve 16 is removed from the lower end of tube 10 and cannot be welded at its lower end, at least two brazed joints are needed. The process is the same as that previously described except that both joints are made by brazing. Because there are at least two brazed joints, an induction coil 42 as shown in FIG. 3 may be employed so as to heat both braze regions simultaneously.

Therefore, it can be seen that the invention provides a method for preparing and brazing a sleeve within a heat exchange tube of a nuclear steam generator in a quick and efficient manner thereby yielding a leaktight joint between the sleeve and tube.

What we claim is:

1. A method for preparing a metal sleeve for brazing comprising:
    cleaning the outer surface of said sleeve;
    depositing a braze material on the outer surface of said sleeve;
    applying an adhesive of approximately 1.5% to 12% acrylic resin by weight dissolved in toluene to said braze material;
    heating said sleeve to soften said adhesive; and
    applying a flux to said adhesive whereby said adhesive causes said flux to be affixed to said braze material.

2. The method according to claim 1 wherein said step of heating comprises heating said sleeve to between approximately 150° to 165° C. to soften said adhesive.

3. The method according to claim 2 wherein said step of applying a flux comprises immersing said sleeve in a fluidized bed of sodium tetraborate powder.

4. The method according to claim 3 wherein said method further comprises spraying an acrylic over said flux to ensure adhesion of said flux to said braze material.

5. The method according to claim 4 wherein said method further comprises heating said sleeve to approximately 150° C. for approximately 10 minutes for fusing the surface of said sprayed-on acrylic to said flux.

6. A method for preparing a metal sleeve for brazing comprising:
    applying a braze material of approximately 82% gold and 18% nickel to said sleeve;
    applying to said braze material an adhesive of approximately 1.5% to 12% acrylic resin by weight dissolved in toluene;
    heating said sleeve to between approximately 150° C. to 165° C. to soften said adhesive; and
    immersing said sleeve in a fluidized bed of sodium tetraborate flux powder whereby said adhesive causes said flux to be affixed to said braze material.

* * * * *